A. W. REYNOLDS.
TRACTOR PLOW.
APPLICATION FILED OCT. 14, 1920.
1,381,662.
Patented June 14, 1921.
4 SHEETS—SHEET 4.
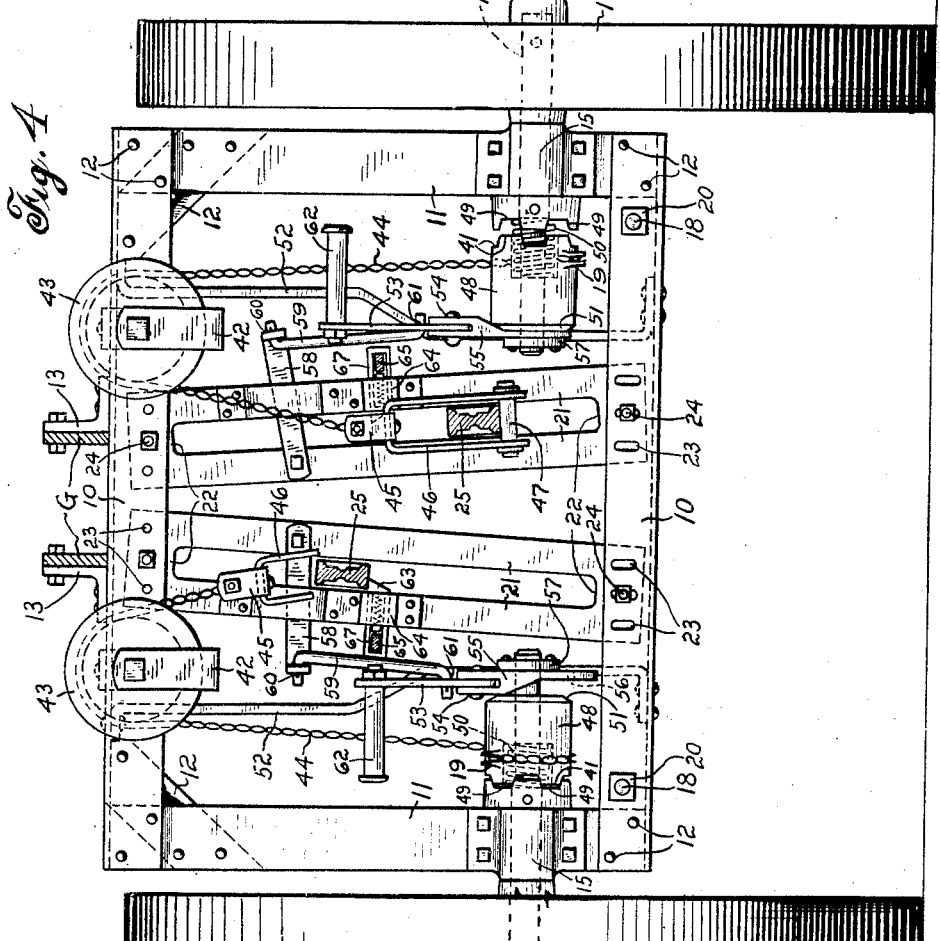
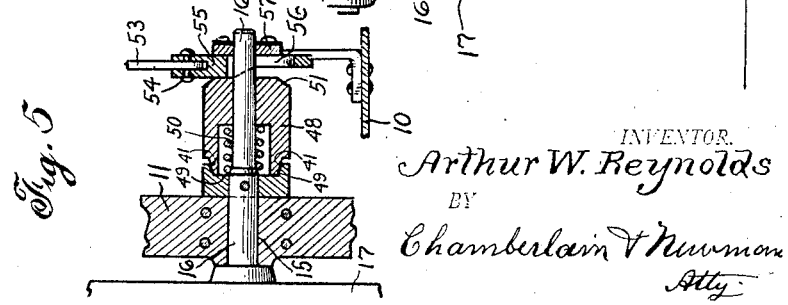
INVENTOR.
Arthur W. Reynolds
BY
Chamberlain & Newman
Atty.

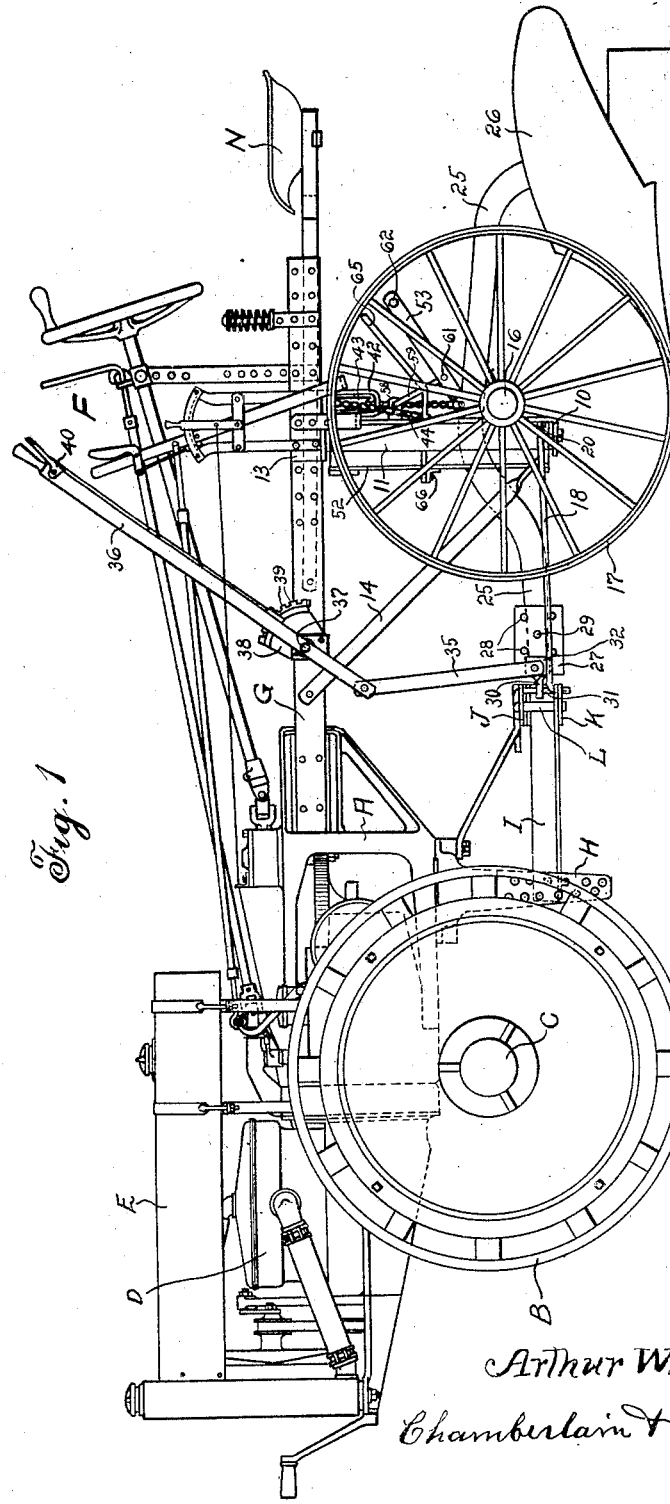

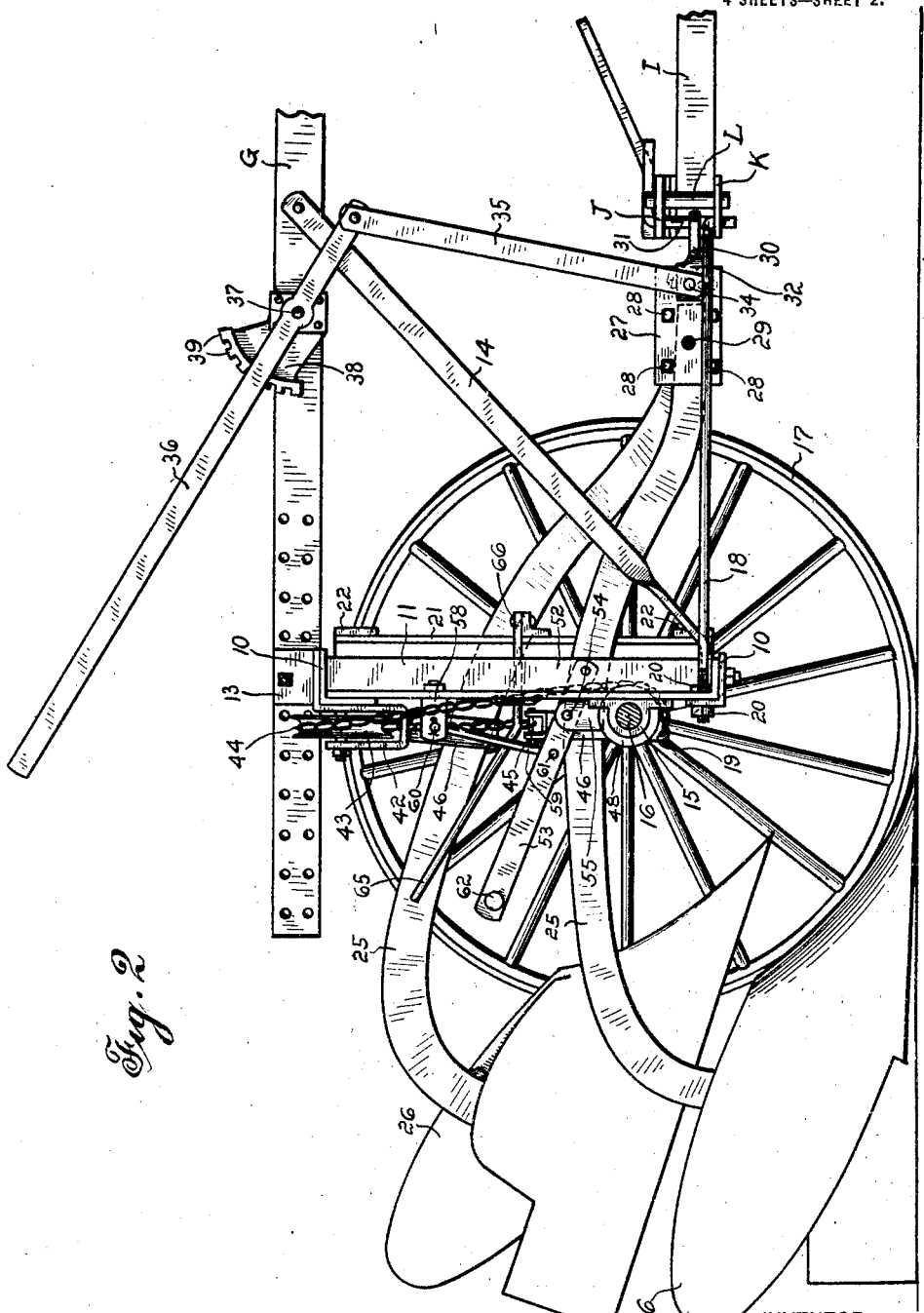

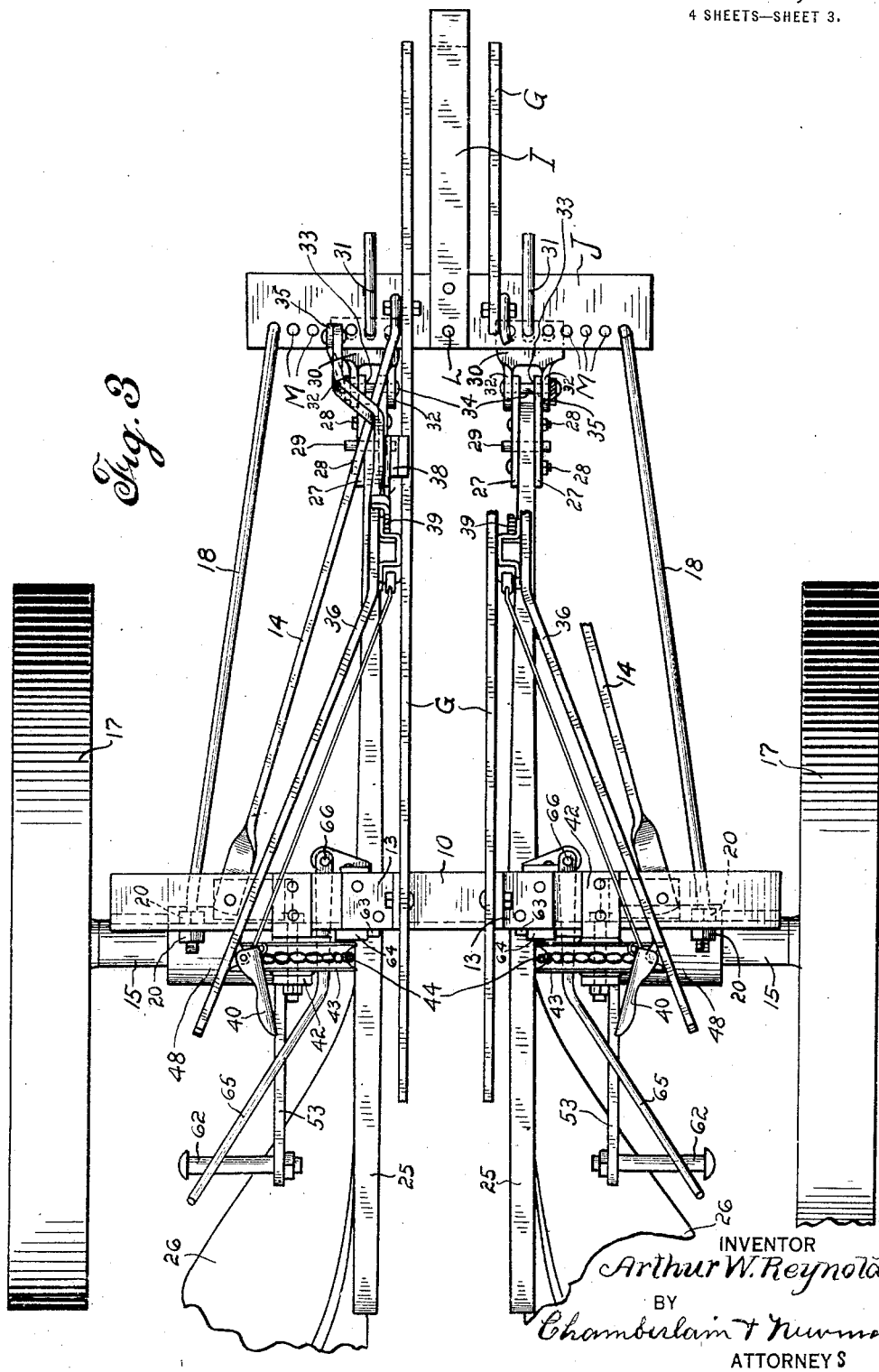

UNITED STATES PATENT OFFICE.

ARTHUR W. REYNOLDS, OF NEWTOWN, CONNECTICUT, ASSIGNOR OF ONE-HALF TO EDWARD BENEDICT, OF NEWTOWN, CONNECTICUT.

TRACTOR-PLOW.

1,381,662.  Specification of Letters Patent.  Patented June 14, 1921.

Application filed October 14, 1920. Serial No. 416,834.

*To all whom it may concern:*

Be it known that I, ARTHUR W. REYNOLDS, a citizen of the United States, and resident of Newtown, in the county of Fairfield and State of Connecticut, have invented certain new and useful Improvements in Tractor-Plows, of which the following is a specification.

This invention relates to a new and useful tractor plow of the character shown and described in my prior Patent No. 1,301,744, granted April 22, 1919.

One of the principal objects of the invention is to provide a plow of the type mentioned which can be closely hitched to a two wheel tractor and which is itself supported on a pair of wheels. Another important object is to design a plow, which, when so hitched, will be positioned forward of the driver of the tractor so that the driver will be better able to observe the working of the plow and to operate the same from time to time as occasion may require. A further object is to provide means for raising and lowering the front ends of the plow beams to better regulate the depths of the furrows to be made. Other important objects are to provide power mechanism whereby the plows may be raised and lowered when moving forward or backward as for instance when turning at the ends of furrows, and to provide adjustable guides for the plow beams whereby the angular positions of the plows may be changed to cause the same to cut to better advantage, as for instance on side hills or in extra hard ground.

While I have shown the improved plow applied to a commercial type of two wheel tractor which is particularly well adapted for drawing the same, it will of course be obvious that the plow can be applied to other forms of tractors with equally good results.

With these and other objects in view the invention resides and consists in the construction and novel combination and arrangement of parts hereinafter more fully described, illustrated in the accompanying drawings and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figures of the accompanying drawings forming a part of this specification, and upon which—

Figure 1 is a side elevation of my improved form of tractor plow illustrated as attached to a commercial form of two wheel tractor known as a "Planet Jr." tractor;

Fig. 2 is a side elevation of the plow on an enlarged scale, one of the wheels of the plow being omitted and the axle being shown in section;

Fig. 3 is a plan view of the plow on an enlarged scale, parts being broken away;

Fig. 4 is a rear elevation of the plow on an enlarged scale, the plow beams being in section, showing the adjustable guides for making angular adjustments of the plow beams and the power mechanism for raising and lowering said plow beams; and Fig. 5 is a detail sectional view of the clutch and its associated parts.

In order that the present invention may be made clear so that it can be better understood, I shall, in the full description now to be made, designate those elements which relate to parts of the tractor disclosed by means of reference letters. The elements and parts of the improved plow will be designated by reference numerals.

In the brief description of the tractor, A denotes a portion of the main body of the tractor, B traction wheels, C the axle for the traction wheels, D the motor, E, the gasolene tank, F means for steering and otherwise operating the tractor, G tractor beam or beams carried by that portion of the tractor denoted by A and extending rearwardly for some considerable distance. H is a depending arm carried by the tractor body and provided with holes, I a draw bar support adapted to be secured at any desired elevation on depending arm H and extending rearwarly from said depending arm, and J—K denote parallel, spaced apart plates constituting the draw bar for the plow beams. Connecting pins L between the plates insure their relative positions. The draw bar support extends between the plates and is rigidly secured to both of them at their central portions. Each plate is provided with a series of alined pin holes M and all of the openings in both plates preferably lie in the same vertical plane. N is a seat for the driver carried by the rear ends of the tractor beams.

The plow of the invention is in part attached to the tractor beams and in part attached to the draw bar, and furnishes a support for the rear ends of the tractor beams.

In the drawings I have shown a rectangular frame consisting of horizontally arranged angle irons 10 and vertically arranged plates 11 which are secured together at the corners designated by 12. The upper horizontal angle iron is secured to the tractor beams in any desired manner, as by means of angle pieces 13, and braces 14 which extend from the tractor beams to the lower horizontal angle iron. The rectangular frame is thus fixed to the tractor beams. The vertical plates of the frame are provided with bearings 15 in which are journaled short shafts 16 each carrying wheels 17. The inner ends of these shafts are supported in bearings on intermediate members of the frame secured to the upper and lower angle irons respectively. Tie rods 18 connect the draw bar with the lower horizontal angle iron of the frame. As shown, the forward ends of the tie rods are secured in holes in the ends of plate K of the draw bar, and the threaded rear ends thereof pass through holes in said lower horizontal angle iron. Nuts 20 fix the draw bar and lower portion of the frame the proper distance apart.

The rectangular frame, already described, supports adjustable guides for the plow beams. Referring more particularly to Fig. 4, two adjustable guides are there shown, one for each plow beam. Each comprises a guide yoke consisting of two parallel vertically arranged channel pieces, denoted by 21, which are tied together by means of short horizontally arranged pieces 22. Each guide yoke may consist of but one continuous piece. Holes 23 in the lower horizontal angle iron are elongated as shown, so that the lower ends of the guide yokes can be secured to the lower horizontal angle iron by use of any one of the series of holes, thus making it possible to arrange the guide yokes so that they are parallel with, or at any desired angle to, the vertical angle irons of the rectangular frame.

The plow beams, denoted by 25 are mounted in the guideways which are adjustable at the top and bottom thereby allowing the plow bottoms, denoted by 26, carried at the rear end of the plow beams, to be adjusted to any desired angle with respect to the ground to be plowed; depending on whether it is side hill or level, hard or soft.

The front end of each plow beam is connected with the draw bar in a manner now to be described. A pair of plates 27 having alined holes are secured together in spaced relation by means of bolts 28. The plow beam freely extends between these plates and is itself provided with a hole. A breakable wooden pin 29 passing through the holes of the plates and plow beam respectively, makes the connection. Should the plow point strike an obstruction, the wooden pin would readily break to release the plow beam. 30 denotes a clevis, one for each plow beam, one end of which is adapted to be located between the draw bar plates and the other end of which is adapted to be attached to plates 27. As more clearly disclosed in Figs. 2 and 3, the end of the clevis received between the draw bar plates is provided with elongated openings adapted to receive a removable pin bolt 31 which may be placed in any one of the alined pin holes in each of the plates of the draw bar to attach the plow beam to the plow at any desired distance from the center of the line of draft, and the end of the clevis adapted to be secured to plates 27 is provided with ears 32 one of each of which is positioned on the outer side of a plate 27. Each ear is provided with a hole and the adjacent ends of plates 27 are each provided with holes 33 arranged transversely of said plates. A pin 34 can be passed through the ears of the clevis and through any desired alining holes of plates 27 to pivot the clevis at any desired elevation on said plates.

The means for causing the front ends of the plow beams to be raised and lowered to better regulate the depths of the furrows will now be fully described. 35 denotes a pair of links, the lower ends of which are pivoted on the before mentioned bolts or pins 34 carried by plates 27. The upper ends of these links are pivoted to levers 36 which are themselves pivoted to the tractor beams as indicated at 37. The tractor beams carry quadrants 38 provided with ratchet teeth 39, and each lever 36 is provided with mechanism 40 adapted to move a pawl into and out of engagement with ratchet teeth 39. When the front end of a plow beam is to be elevated or lowered the pawl is first released from the ratchet teeth and lever 36 is forced downwardly or upwardly the desired distance. The pawl is then allowed to again engage the ratchet teeth and the lever is thus locked. It will be evident that when the front ends of the plow beams are being adjusted the clevises slide on the removable pin bolts of the draw bar. As the plow beam is lowered the plow will obviously plow deeper and shallower as the beam is raised.

The power mechanism for raising and lowering the plow members is more clearly disclosed in Figs. 4 and 5. As the mechanism is the same in the case of each plow member, but one set of reference numerals will be necessary in making the description. 42 denotes brackets carried by the upper portion of the rectangular frame of the plow, and 43 denotes pulleys mounted in the brackets. See Figs. 2 and 3 in connection with Fig. 4. 44 denotes chains, one end of each of which is provided with a clip 45 adapted to receive the looped portion of a clevis 46, one for each plow beam. A portion of one of the clevises in Fig. 4 is shown broken away to better show the latch. The plow beams pass between the arms of the clevises, and extending between the arms and below the plow beams are studs each carrying a roller 47 upon which the lower edges of the plow beams are adapted to rest. The chains pass over the pulleys and the opposite end of each chain is secured at 19 to a cylindrical member 48, which members are normally loosely positioned on the inwardly extending portions of the short shafts for the wheels and are provided on their outer ends with male clutch faces 41 adapted to engage female clutch faces 49 fixed on the shafts to turn therewith. 50 denotes a spring normally holding the clutch faces from each other. The inner ends of the cylindrical members are beveled as denoted at 51 for a purpose to be made obvious. Intermediate members 52 extending downwardly from the upper portion of the rectangular frame pivotally support the lower ends of clutch levers 53. See Fig. 2 in connection with Fig. 4. Pivoted to the clutch levers as indicated at 54 are wedge members 55 having elongated slots 56 through which the wheel shafts freely pass. 57 denotes extensions of intermediate members 52 secured to the lower portion of the rectangular frame and having bearings in which the inner ends of the short shafts are mounted. The inner sides of the wedge members are smooth and continuous and are adapted to slide upon the extensions of intermediate members 52. The working faces of the wedge members normally rest on beveled portions 51 of the cylindrical members. See the wedge member at the right hand side in Fig. 4. 58 denotes horizontally arranged links pivoted to one of the vertical members of each guide yoke and adapted to extend across the guide spaces of said yokes and above the plow beams, and 59 denotes vertically arranged links pivoted to links 58 as denoted at 60 and to the clutch levers as denoted at 61. 62 denotes foot engaging members projecting from the clutch levers. The arrangement of the cylindrical members and wedge members on the inner portions of the shafts is such that when the wedge members are depressed by means of the clutch levers, the cylindrical members are caused to move outwardly on the shafts so that the clutch faces engage each other. Spring pressed latches 63 are arranged in brackets 64 carried by the guide yokes so that the latches normally extend into the guide spaces of the yokes, through which the plow beams pass. 65 denotes plow beam release levers pivoted on the rectangular frame in any desired manner, as denoted at 66, and having engagement with the latches as denoted at 67, in such manner that the plow beam release levers can be manipulated to cause the latches to be entirely removed from the guide spaces for the plow beams.

The description already made, when considered in connection with the illustrations of the drawings, is sufficient to show that the plow is closely hitched to the tractor; that the mechanism for manipulating the plow is positioned forward of the driver; that the front ends of the plow beams can be raised and lowered by the operator while the plow is in use to regulate the depths of the furrows; and that the guide yokes are capable of adjustment to position the plow members at any desired angles with respect to the ground.

The method of causing the power lift mechanism to operate to raise and lower the plow members will now be described. When the plow is in use the plow beam is positioned at or near the bottom of its guide yoke, the cylindrical member is free on its shaft and the plow beam is loosely connected by the chain which is secured at one of its ends to the clevis which incloses the plow beam, passes over one of pulleys 43, and is secured at its other end to the cylindrical member. When the clutch lever is depressed, the wedge member causes the cylindrical member to slide on the short shaft so that the clutch faces engage each other, and when thus engaged the flat surface of the wedge 55 rests against the flat surface of the cylindrical member 48, thereby holding the clutch faces together so that they cannot be disengaged until the wedge 55 is released. The cylindrical member then turns with the shaft when the tractor is in motion whether moving forward or backward, and the chain winds up on the cylindrical member and thus causes the plow beam to be lifted. The horizontally arranged link on the guide yoke is located at some considerable distance above the spring pressed latch and the latch is so arranged, see Fig. 4, that as the plow beam moves upwardly the latch is pressed away from the guide way to allow the plow beam to pass. When the plow beam has passed the latch in its upward movement, the latch returns to its normal position. That is, it again extends into the guide way. When now the cylindrical member has turned with the shaft until the upper edge of the plow beam engages the horizontal link and caused it to rotate on its pivot, it will, by means of the vertically arranged link which is connected with the clutch lever, cause the wedge member to be elevated to allow the spring in the clutch, with the assistance of the beveled clutch jaws (which naturally force themselves apart when not held in) to move the clutch faces apart, so that the cylindrical member will again be free to turn on the shaft. The weight of the plow member and plow beam will cause the plow beam to slide downwardly in the guide way, but the downward movement will be arrested by the latch. See the latch and plow beam at the left hand side in Fig. 4. When now the plow beam release lever is manipulated to remove the latch from the guide way, the plow beam will move to its lowest position in the guide yoke. The horizontally arranged link 58 on the guide yoke will, when lifted by the plow beam, be held in elevated position by means of the vertically arranged link and the wedge member, the spring in the clutch being of sufficient strength to hold the cylindrical member so that its beveled face holds up the wedge member.

I have preferred to show the features of the present invention as applied to a plow having a pair of plow bottoms one of which is adapted for throwing the furrow to the right and the other to the left. But one of the plow bottoms is in use at a time. Both can be simultaneously raised and held in elevated position and each is capable of adjustment independent of the other.

Having thus described my invention, what I claim and desire to secure by Letters Patent is:

1. In combination, a tractor having tractor beams and a draw bar, and a plow having a rectangular frame and a plow beam, said rectangular frame secured to said tractor beams and located therebeneath and said plow beam extending through said rectangular frame and having connection with said draw bar.

2. In combination, a tractor having tractor beams and a draw bar, and a plow having a rectangular frame and a plow beam, said rectangular frame suspended beneath said tractor beams and provided with an adjustable guide, and said plow beam extending through said adjustable guide and secured to said draw bar.

3. In combination, a tractor having tractor beams and a draw bar, and a plow having a rectangular frame and a plow beam, said rectangular frame secured beneath said tractor beams and provided with an adjustable guide, and said plow beam extending through said adjustable guide and adapted to be adjustably secured to said draw bar.

4. In combination, a tractor having tractor beams and a draw bar, a plow having a frame adapted to support said tractor beams and provided with a plow beam secured to said draw bar, said frame carrying an adjustable guide yoke for said plow beam and adjustable tie rods extending between said frame and draw bar, whereby said draw bar can be positioned at any desired distance from said frame.

5. In combination, a tractor having tractor beams and a draw bar, a plow having a frame adapted to support said tractor beams and provided with a plow beam secured to said draw bar, said frame carrying an adjustable guide yoke for said plow beam, braces extending between said tractor beams and the lower portion of said frame, and adjustable tie rods extending between said frame and draw bar to properly position said draw bar the desired distance from said frame.

6. In combination, a tractor having tractor beams and a draw bar, and a plow having a rectangular frame and a plow beam, said tractor beams supported by said plow and said plow beam extending through said rectangular frame and having connection with said draw bar.

7. In combination, a tractor having tractor beams and a draw bar, a rectangular frame supporting said tractor beams, wheels supporting said rectangular frame, and a plow beam extending through said rectangular frame and having connection with said draw bar.

8. In a plow of the character described, a draw bar consisting of a pair of parallel, spaced apart plates, a plow beam carrying a plow bottom, means connecting the front end of said plow beam with said draw bar, said means including a pair of spaced apart plates carrying a wooden pin which passes through the forward end of said plow beam, a clevis adapted to be adjustably secured to said plates, and a removable pin adapted to pass through said plates of said draw bar and through said clevis, said clevis extending between the plates of said draw bar, and means for causing said clevis to be slid upwardly or downwardly on said removable pin.

9. In a plow of the character described, a draw bar consisting of a pair of parallel, spaced apart plates having alined holes, a plow beam carrying a plow bottom means connecting the front end of said plow beam with said draw bar, said means including a pair of spaced apart plates carrying a wooden pin which passes through the forward end of said plow beam, said forward end extending freely between said plates, a clevis adapted to be adjustably secured to said plates, and a removable pin adapted to pass through alined holes in said plates of said draw bar and through an opening in said clevis, said clevis extending between the plates of said draw bar, and means for causing said clevis to be slid upwardly or downwardly on said removable pin.

10. In a plow of the character described, in combination, a draw bar consisting of parallel, spaced apart plates having alined holes, a pair of plates supporting the plow beam of the plow, a clevis secured to said last mentioned plates, a removable pin adapted to pass through any alined holes in said draw bar plates and through an opening in said clevis, whereby the plow beam may be supported at any desired location with respect to the line of draft of the plow, and means for raising and lowering the forward end of the plow beam while the plow is in motion, whereby the plow bottom can be made to cut to any desired depth.

11. In a plow of the character described, a frame having horizontally arranged members each provided with a series of alined holes, and a plow beam guide adjustably carried by said members, said plow beam guide carrying bolts at its opposite ends adapted to engage any desired hole in each of said horizontal members, whereby the plow beam guide may be positioned at any desired angle to the horizontal members.

12. In a plow of the character described, a plow beam guide consisting of vertical portions and horizontal portions constructed and arranged to provide a guide yoke having a guide space, said vertical and horizontal portions comprising a single, integral unit constituting said guide yoke.

13. In a plow of the character described, a frame having horizontal members each provided with a series of alined openings, a plow beam guide adjustably carried by said members, said plow beam guide carrying bolts at its opposite ends adapted to engage any desired hole in each of said horizontal members whereby the plow beam guide may be positioned at any desired angle to the horizontal members, a plow beam extending through said guide, and means for fixing the forward end of the plow beam in raised or lowered position while the plow is in motion.

14. In a plow of the character described, a frame having horizontally arranged members, a plow beam guide adjustably carried by said members whereby the plow beam guide may be positioned at any desired angle to the horizontal members, a plow beam extending through said guide, means for fixing the forward end of the plow beam in raised or lowered position while the plow is in motion, and means whereby the plow beam may conform to the angular adjustments of the plow beam guide.

15. In a plow of the character described, a frame having horizontally arranged members, a plow beam guide adjustably carried by said members whereby the plow beam guide may be positioned at any desired angle to the horizontal members, a plow beam extending through said guide, means for fixing the forward end of the plow beam in raised or lowered position while the plow is in motion, and connections for said forward end of the plow beam designed to allow the same to conform to the angular adjustments of said plow beam guide.

Signed at Bridgeport, in the county of Fairfield and State of Connecticut, this 12th day of October, A. D., 1920.

ARTHUR W. REYNOLDS.

Witnesses:
C. M. NEWMAN,
LILLIAN M. ALLING.